(12) United States Patent
Speckbacher et al.

(10) Patent No.: US 8,838,733 B2
(45) Date of Patent: Sep. 16, 2014

(54) SYSTEM AND METHOD FOR MANAGING AN INTERNET DOMAIN BASED ON THE GEOGRAPHIC LOCATION OF AN ACCESSING USER

(75) Inventors: Tobias Speckbacher, Menlo Park, CA (US); Jay L. Webster, Jr., Pacifica, CA (US); Marie Alexander Docter, Los Altos, CA (US)

(73) Assignee: Quova, Inc., Mountain View, CA (US)

( * ) Notice: Subject to any disclaimer, the term of this patent is extended or adjusted under 35 U.S.C. 154(b) by 262 days.

(21) Appl. No.: 12/908,287

(22) Filed: Oct. 20, 2010

(65) Prior Publication Data

US 2012/0102219 A1    Apr. 26, 2012

(51) Int. Cl.
  *G06F 15/16*   (2006.01)
  *H04L 29/12*   (2006.01)
  *H04L 29/08*   (2006.01)

(52) U.S. Cl.
  CPC ...... *H04L 29/12066* (2013.01); *H04L 61/1511* (2013.01); *H04L 61/609* (2013.01); *H04L 67/18* (2013.01); *H04L 29/12981* (2013.01); *H04L 67/2814* (2013.01)
  USPC .......................................... 709/217; 709/245

(58) Field of Classification Search
  USPC .......................................... 709/217–219, 245
  See application file for complete search history.

(56) References Cited

U.S. PATENT DOCUMENTS

| | | | |
|---|---|---|---|
| 6,947,978 B2 | 9/2005 | Huffman et al. | |
| 7,711,850 B2 | 5/2010 | Ronen et al. | |
| 7,809,857 B2 * | 10/2010 | Anderson et al. | 709/245 |
| 8,055,792 B2 * | 11/2011 | Winkler et al. | 709/240 |
| 8,335,486 B1 * | 12/2012 | Ramamurthy | 455/405 |
| 2002/0147790 A1 * | 10/2002 | Snow | 709/217 |
| 2004/0078490 A1 * | 4/2004 | Anderson et al. | 709/245 |
| 2004/0133626 A1 | 7/2004 | Herrero et al. | |
| 2007/0100955 A1 * | 5/2007 | Bodner | 709/217 |
| 2007/0265935 A1 * | 11/2007 | Woycik et al. | 705/26 |
| 2008/0074317 A1 * | 3/2008 | Harper et al. | 342/357.02 |
| 2008/0189192 A1 | 8/2008 | Ronen et al. | |
| 2009/0144411 A1 | 6/2009 | Winkler et al. | |
| 2010/0318631 A1 * | 12/2010 | Shukla | 709/219 |

FOREIGN PATENT DOCUMENTS

| | | |
|---|---|---|
| WO | WO-0057598 A2 | 9/2000 |
| WO | WO-2012054378 A1 | 4/2012 |

OTHER PUBLICATIONS

Eriksson, Brian, et al., "A Learning-Based Approach for IP Geolocation", PAM, [Online]. Retrieved from the Internet: <URL: http://nowak.ece.wisc.edu/geoloc1.pdf>, (2010), 10 pgs.
Laki, S, et al., "A Model Based Approach for Improving Router Geolocation", Computer Networks 54, (2010), 1490-1501.
International Application U.S. Appl. No. PCT/US2011/056529, Search Report Mailed Jan. 23, 2012, 4 pgs.
International Application U.S. Appl. No. PCT/US2011/056529, Written Opinion Mailed Jan. 23, 2012, 4 pgs.

* cited by examiner

*Primary Examiner* — Jeong S Park
(74) *Attorney, Agent, or Firm* — Schwegman Lundberg & Woessner, P.A.

(57) ABSTRACT

A system and method for managing an Internet domain based on the geographic location of an accessing user. A particular embodiment of the system includes: receiving an access request from a client for access to a particular requested domain; determining a geo-location for the client; determining a corresponding geo-specific site based on the requested domain and the geo-location of the client; and redirecting the client access request to the corresponding geo-specific site.

15 Claims, 15 Drawing Sheets

Existence Features

| Feature Name | Data Type | Description |
|---|---|---|
| Does-hostname-label-exist | Boolean | If true, the hostname-label intermediate assignment exists for this block. Otherwise, false. |
| Does-network-registry-exist | Boolean | If true, the network registry intermediate assignment exists for this block. Otherwise, false. |
| Does-complete-traceroute-exist | Boolean | If true, the complete traceroute intermediate assignment exists for this block. Otherwise, false. |

FIGURE 10

Match Features

| Feature Name | Data Type | Description |
|---|---|---|
| Does-hostname-label-match-network-registry | Boolean | True, if the hostname-label location is within 25 miles of the network-registry intermediate assignment, False, otherwise. |
| Does-hostname-label-match complete-traceroute | Nominal | Matches-Selves-and-Candidate, if hostname-label is within 25 miles of complete-traceroute location and if hostname-label is also within 25 miles of network registry location. Matches-Selves-but-Not-Candidate, if hostname-label is within 25 miles of complete-traceroute location and if hostname-label is not within 25 miles of network registry location. No-Match, if hostname-label is more than 25 miles from complete-traceroute location. Missing, if either the hostname-label or the complete-traceroute intermediate assignment is missing. |
| Network-registry-matches-complete-traceroute | Boolean | True, if the network-registry location is within 25 miles of the complete traceroute intermediate assignment, False, otherwise. |

FIGURE 11

Ancillary Features

| Feature Name | Data Type | Description |
|---|---|---|
| Routable | Boolean | If true, the network is currently routable (i.e. the network appears in the BGP routing table). Otherwise, false. |
| Connection-type | Nominal | e.g. (DSL, Cable, Dialup, Satellite, etc.) |

FIGURE 12

SYSTEM AND METHOD FOR MANAGING AN INTERNET DOMAIN BASED ON THE GEOGRAPHIC LOCATION OF AN ACCESSING USER

TECHNICAL FIELD

Various embodiments illustrated by way of example relate generally to the field of Internet domain management and geographic location determination and, more specifically, to a system and method for managing an Internet domain based on the geographic location of an accessing user.

BACKGROUND

Geography plays a fundamental role in everyday life and affects, for example, the products that consumers purchase, shows displayed on TV, and languages spoken, etc. Information concerning the geographic location of a networked entity, such as a network node, an Internet domain server, and a network user may be useful for any number of reasons.

Geographic location may be utilized to infer demographic characteristics of a network user. Accordingly, geographic information may be utilized to direct advertisements or offer other information via a network that has a higher likelihood of being relevant to a network user at a specific geographic location.

Geographic information may also be utilized by network-based content distribution systems as part of a Digital Rights Management (DRM) program or an authorization process to determine whether particular content may validly be distributed to a certain network location. For example, in terms of a broadcast or distribution agreement, certain content may be blocked from distribution to certain geographic areas or locations.

Content delivered to a specific network entity, at a known geographic location, may also be customized according to the known geographic location. For example, localized news, weather, and events listings may be targeted at a network entity where the geographic location of the networked entity is known. Furthermore content may be presented in a local language and format.

Knowing the location of network entity can also be useful in combating fraud. For example, where a credit card transaction is initiated at a network entity, the location of which is known and far removed from a geographic location associated with an owner of the credit card, a credit card fraud check may be initiated to establish the validity of the credit card transaction.

There are various ways to determine the geographic location of a network entity with varying levels of accuracy. Techniques have been used to redirect a user to a particular Domain Name Server (DNS) or to redirect user clicks to click interceptor/redirectors.

U.S. Pat. No. 7,711,850 describes an electronic marketplace that allows owners of unused Internet domain names to lease the domain names using a bidding process. The system allows owners to monetize domain names and lessees to obtain customers who are redirected from targeted domain names. However, the '850 patent describes a technique for looking at the Internet Protocol (IP) address of the web surfer to determine the general geographic location of the web surfer. The geographic location associated with the IP address of the web surfer can be misleading and thus can result in inappropriate redirects. Further, the '850 patent describes a technique for the temporary use of a domain sold to a single winning bidder. The '850 patent does not describe subdividing the use of a domain by geography.

BRIEF DESCRIPTION OF THE DRAWINGS

Embodiments are illustrated by way of example and not limitation in the figures of the accompanying drawings, in which like references indicate similar elements and in which:

FIG. 10 illustrates examples of portions of the existence features used in a particular embodiment;

FIG. 11 illustrates examples of portions of the match features used in a particular embodiment;

FIG. 12 illustrates examples of portions of the ancillary features used in a particular embodiment;

DETAILED DESCRIPTION

Figure 1:
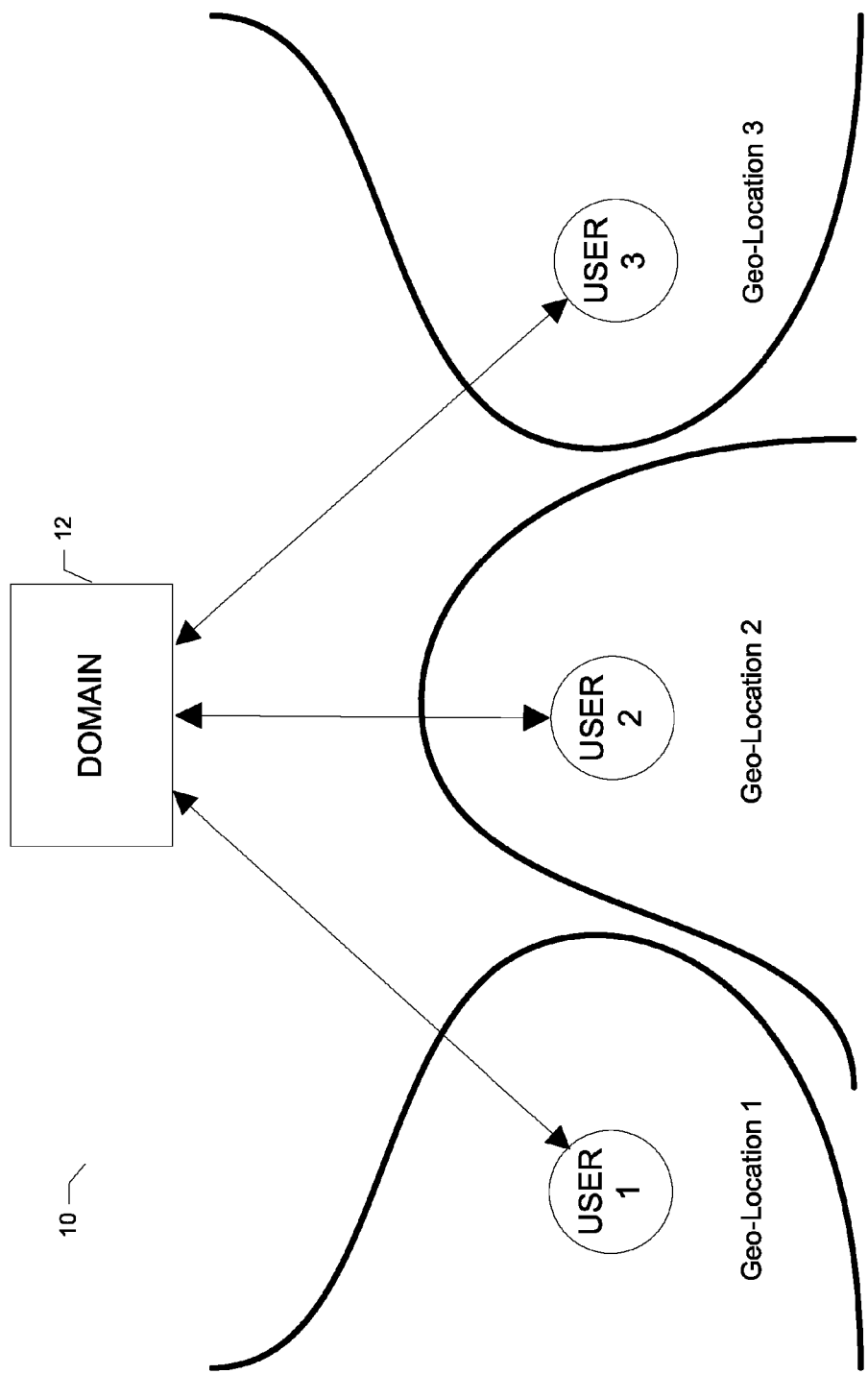
FIG. 1 illustrates a conventional network diagram depicting a system having a domain to which a plurality of users are in networked data communications, according to an example embodiment.

According to example embodiments, a system and method for managing an Internet domain based on the geographic location of an accessing user is described.

Other features will be apparent from the accompanying drawings and from the detailed description that follows. In the following description, for purposes of explanation, numerous specific details are set forth in order to provide a thorough understanding of embodiments. It will be evident, however, to one of ordinary skill in the art that the present description may be practiced without these specific details.

In various example embodiments described herein, a system enables a broker to intercept an access from a user to a particular Internet domain and then redirect the access to a server that serves a geographical area corresponding to the geographical locale of the user. A domain owner can thereby efficiently manage and separately monetize the domain name based on the geographical locale of the accessing users.

As described in various example embodiments, a domain owner can set up a relationship with a domain broker whereby the domain broker receives user clicks on the domain owner's domain name. The domain broker can use geo-location technology to determine a geo-location of the user. The domain owner or broker can also set up a database that defines a relationship between various geo-locations and servers that service those locations. Third party licensees or bidders can bid on the various geo-locations under the particular domain and win the opportunity to have their server associated with a particular geo-location in the database. Then, the third party licensees or winning bidders pay the domain owner a fixed fee, the bid price, or a variable fee based on each geo-specific click that is redirected to the third party's server. In this way, third party licensees can minimize their costs to only paying for clicks originating from a defined geo-location. The domain owner can maximize their income by receiving revenue from a larger group of third party licensees.

For the purposes of the present specification, the term "geographic location" shall be taken to refer to any geographic location or area that is identifiable utilizing any descriptor, metric or characteristic. The term "geographic location" shall accordingly be taken to include a continent, a country, a state, a province, a county, a city, a town, village, an address, a Designated Marketing Area (DMA), a Metropolitan Statistical Area (MSA), a Primary Metropolitan Statistical Area (PMSA), location (latitude and longitude), zip or postal code areas, and congressional districts. Furthermore, the term "location determinant" shall be taken to include any indication or identification of a geographic location.

The term "network address", for purposes of the present specification, shall be taken to include any address that identifies a networked entity, and shall include Internet Protocol (IP) addresses.

Typically, most network addresses (e.g., IP addresses) are associated with a particular geographic location. This is because routers that receive packets for a particular set of machines are fixed in location and have a fixed set of network addresses for which they receive packets. The machines that routers receive packets for tend to be geographically proximal to the routers. But, this may not always be the case. For example, roaming Internet-Ready devices are exceptions. For certain contexts, it is important to know the location of a particular network address or set of addresses. Mapping a particular network address to a geographic location may be termed "geolocation". Various methods of obtaining geographic information, combining such geographic information, and inferring a "block" to which a network address corresponds and which shares the same geographic information can be used. The details of the geolocation techniques used in the various embodiments are described in more detail below. Initially, however, the details of the techniques used in the various embodiments for efficiently managing and separately monetizing a domain name based on the geographical locale of the accessing users are provided next.

FIG. 1 illustrates a conventional network diagram depicting a system 10 having a domain 12 to which a plurality of users (e.g., users 1, 2, and 3) are in networked data communications. Domain 12 can represent a server or other site associated with a particular domain name. As well known, users can be served links to domain names in web pages or other content items. In this conventional configuration shown in FIG. 1, users from any geographical location (e.g., geo-locations 1, 2, or 3) who access a link associated with domain 12 will be directed to domain 12. However, the owner or operator of domain 12 may not want or need users from remote geo-locations to visit domain 12; because, these users typically have low conversion rates. In other cases, the owner or operator of domain 12 may not be able to support or legally sell products or services to users from remote geo-locations. Given the conventional configuration, the owner or operator of domain 12 cannot effectively manage the traffic to domain 12 based on the geo-location of the accessing users.

Figure 2:
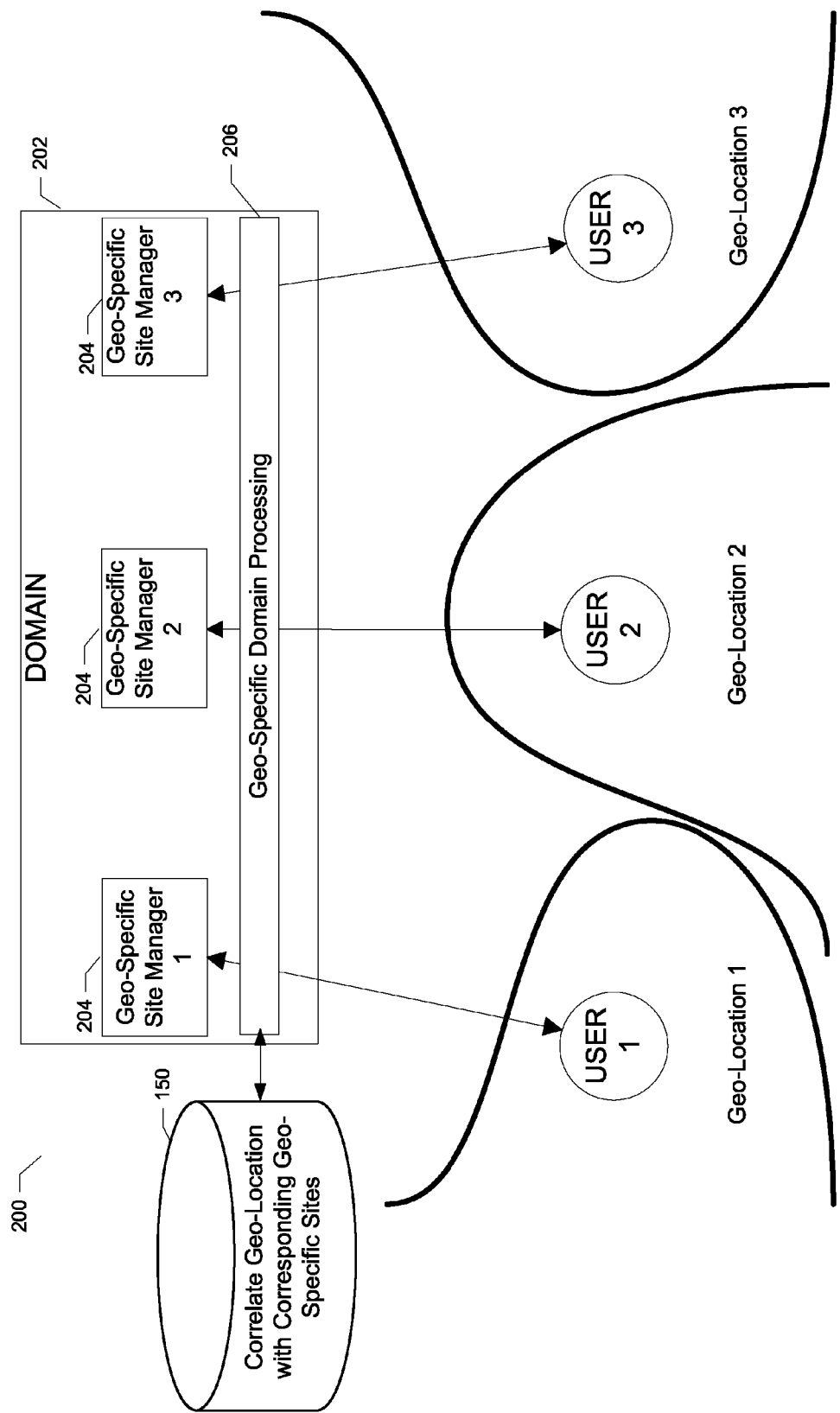
FIGS. 2 through 4 illustrate a network diagram, according to example embodiments, depicting systems having a domain to which a plurality of users are in networked data communications.
Figure 3:
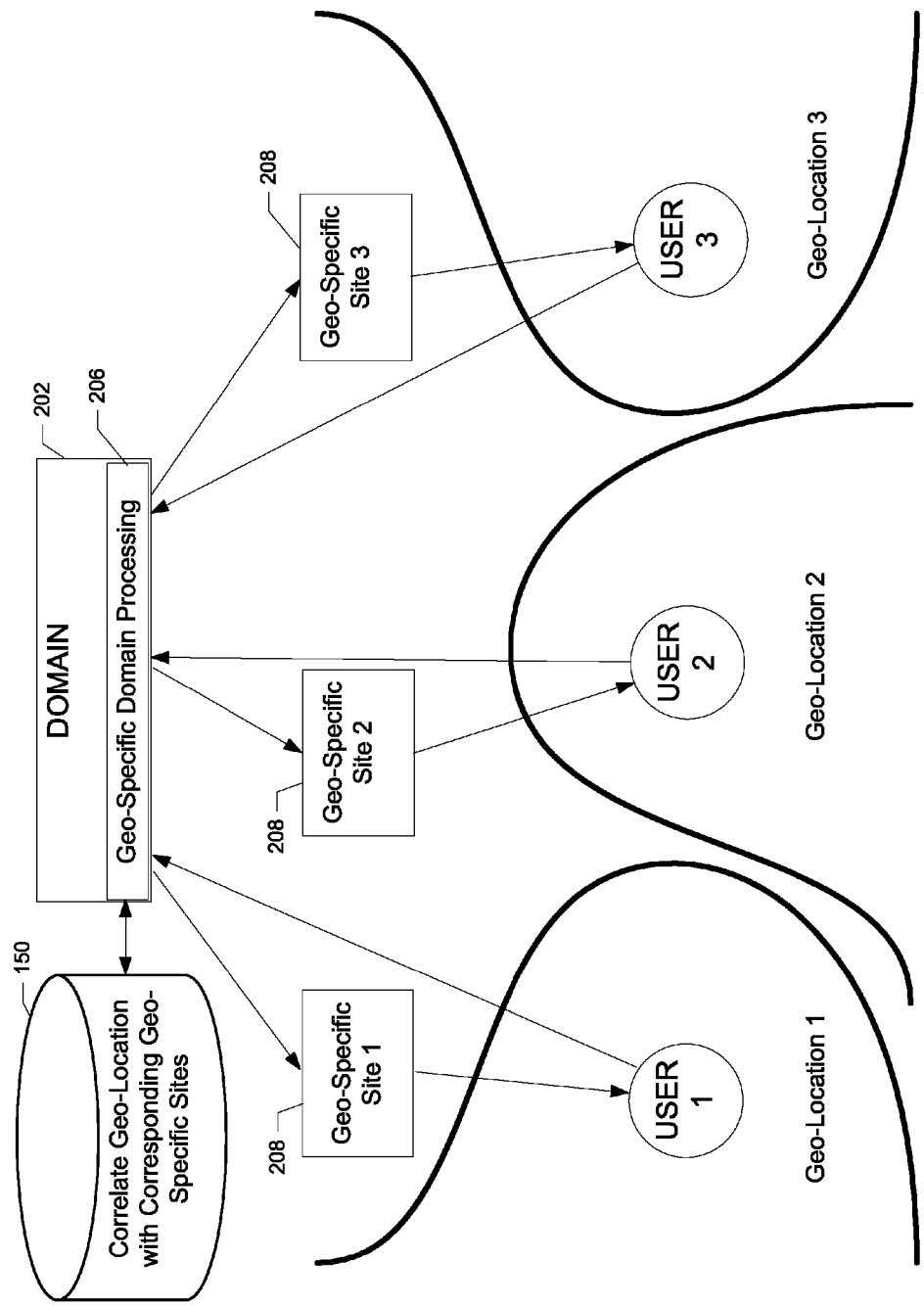

FIG. 2 illustrates a network diagram, according to an example embodiment, depicting a system 200 having a domain 202 to which a plurality of users (e.g., users 1, 2, and 3) are in networked data communications. System 200 includes geo-specific site managers 204 (e.g., geo-specific site managers 1, 2, and 3). System 200 also includes a geo-specific domain processing component 206 and database 150. Each of the geo-specific site managers 204 can be components of domain 202 as shown in FIG. 2. Alternatively, geo-specific site managers 204 can receive redirected links from domain 202; but, they can be implemented separately from domain 202 as shown in FIG. 3. In general, the geo-specific domain processing component 206 of an example embodiment can determine the geo-location of users who access the link or identifier (e.g., a uniform resource locator or URL) associated with domain 202. When domain 202 receives an indication that a user (e.g., user 2) has activated a link or URL associated with domain 202, the geo-specific domain processing component 206 initially receives the user (e.g., user 2) access. As described in more detail below, the geo-specific domain processing component 206 can use various techniques to accurately determine a precise geographical location corresponding to the accessing user (e.g. geo-location 2 corresponding to user 2). This accessing user geo-location can be compared with the information in database 150 to determine which of a plurality of pre-configured geo-specific sites correspond with the geographical location corresponding to the accessing user. Each of the geo-specific sites can be pre-configured with information in database 150, the pre-configured information in database 150 can define the geographical region corresponding to each geo-specific site and a link or URL for accessing each geo-specific site. Using this information, the geo-specific domain processing component 206 can determine a particular geo-specific site corresponding with the geographical location corresponding of the accessing user. The geo-specific domain processing component 206 can also determine the link or URL for accessing the particular geo-specific site. In this manner, the geo-specific domain processing component 206 of domain 202 can receive links or accesses from accessing users and direct or redirect the accessing users to a particular geo-specific site corresponding with the geographical location of the accessing user. In an embodiment shown in FIG. 2, the accessing users can be directed to a particular geo-specific site manager 204 corresponding with the geographical location of the accessing user. In an embodiment shown in FIG. 3, the accessing users can be re-directed to a particular geo-specific site 208 corresponding with the geographical location of the accessing user. In the embodiment of FIG. 3, the link or URL for accessing the particular geo-specific site 208 can be obtained from database 150.

Figure 4:
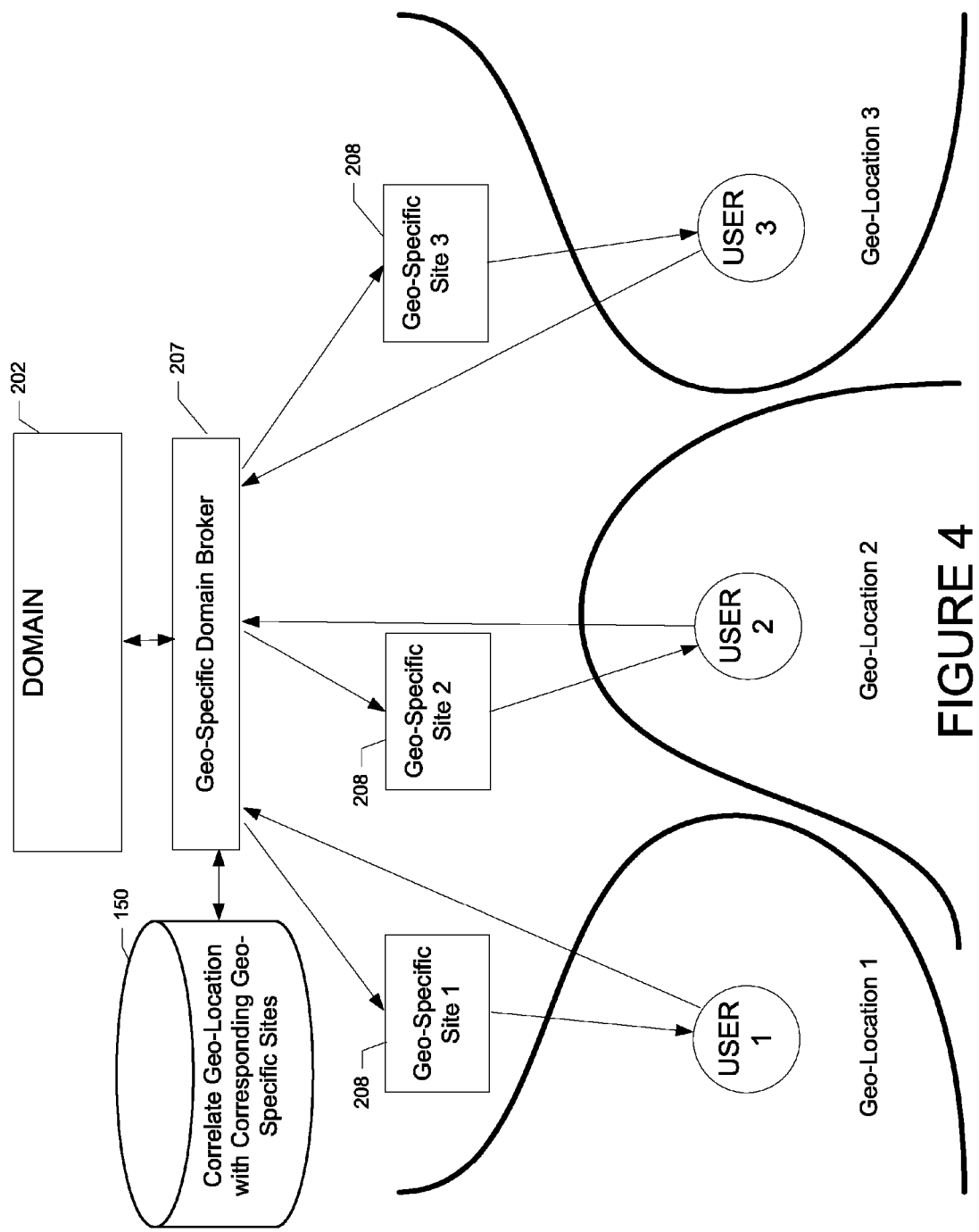

FIG. 4 illustrates a network diagram, according to an example embodiment, depicting a system having a domain 202 with which a geo-specific domain broker 207 is in networked data communications. The geo-specific domain broker 207 is also in network data communications with a plurality of users (e.g., users 1, 2, and 3). In a manner similar to the geo-specific domain processing component 206 of an example embodiment described above, the geo-specific domain broker 207 can determine the geo-location of users who access the link or identifier (e.g., a uniform resource locator or URL) associated with domain 202. The embodiment of FIG. 4 offers a configuration in which the geo-location determination processing is moved out of the domain 202.

Given the system configurations shown in FIGS. 2 through 4 and described above, the owner of domain 202 can effectively manage the Internet domain based on the geographic location of an accessing user. This ability to manage the Internet domain based on the geographic location of an accessing user can be exploited in a variety of ways. Firstly, the owner of domain 202 could arrange a business enterprise associated with the domain 202 based on the geographic location of accessing customers. For example, the owner of domain 202 could offer particular goods or services or target advertising for customers from particular geographic locations. The targeting of goods/services and advertising based on geo-location would likely increase the value of those goods/services and advertising to accessing customers.

Secondly, the owner of domain 202 could opt to focus a business enterprise associated with the domain 202 on a particular geographic location of accessing customers. For example, the owner of domain 202 may not have the resources or interest to service customers in a variety of geographic locations associated with domain 202. In this case, for example, the owner of domain 202 could limit the business to servicing customers only from geo-location 2. Customers accessing domain 202 from geo-location 1 or geo-location 3 would be ignored. In the conventional network configuration described above, these user accesses from un-supported geo-locations would be wasted. In the conventional network configuration, the owner of domain 202 would gain no benefit or revenue from these wasted accesses.

In the various embodiments described herein, the owner of domain 202 can monetize these user accesses from un-supported geo-locations by licensing a third party to receive these user accesses from particular geo-locations. Referring again to FIG. 3, a network structure for redirecting user accesses to domain 202 based on the geographic location of an accessing user was described. In the example embodiment, each of the particular geo-specific sites 208 receives user links or accesses only from users at geographical locations corresponding to the particular geo-specific sites 208. In this manner, the set of users accessing domain 202 can be geographically partitioned. Given this technique for geographically partitioning the accessing users, the owner of domain 202 can sell licenses for each geographical partition to any third party. Alternatively, the owner of domain 202 can set up an auction and receive bids for a license for each geographical partition from any third party bidders. Importantly, the process for determining the geo-location of accessing users, as described herein, is precise; so, licensed third parties can be assured that accessing users will not be re-directed improperly.

In the various embodiments described herein, the owner of domain 202 can effectively franchise the domain 202. The owner of domain 202 retains complete ownership of the domain name and associated links and URLs. However, the licensed or franchised third parties can pay for the opportunity to leverage the domain 202. The licensed or franchised third parties can be assured that the accessing users will be accessing the domain 202 from a defined geographical region. In a variety of embodiments, the financial arrangement between the owner of domain 202 and the licensee/franchisee can be variable. In one financial arrangement, the licensee/franchisee can pay a fixed fee for the geo-specific license/franchise for a pre-defined time period. The fixed fee can be a set amount, a negotiated amount, or a winning bid amount. Alternatively, the licensee/franchisee can pay a variable fee for the geo-specific license/franchise based on the number of user accesses to the geo-specific site, a number of conversions, a return on investment (ROI) score, or other user-specific criteria. The variable fee for the geo-specific license/franchise can also be based on temporal attributes, such as the time/date of a user access, the duration of a user access, or the number of times a user has returned to the geo-specific site. Alternatively, the licensee/franchisee can pay a variable fee for the geo-specific license/franchise based on the amount or value of goods/services sold from the geo-specific site. The owner of domain 202 can also negotiate with the licensee/franchisee for shares of costs and/or revenue derived from advertising and marketing the domain name and its geographical partitions.

Figure 5:
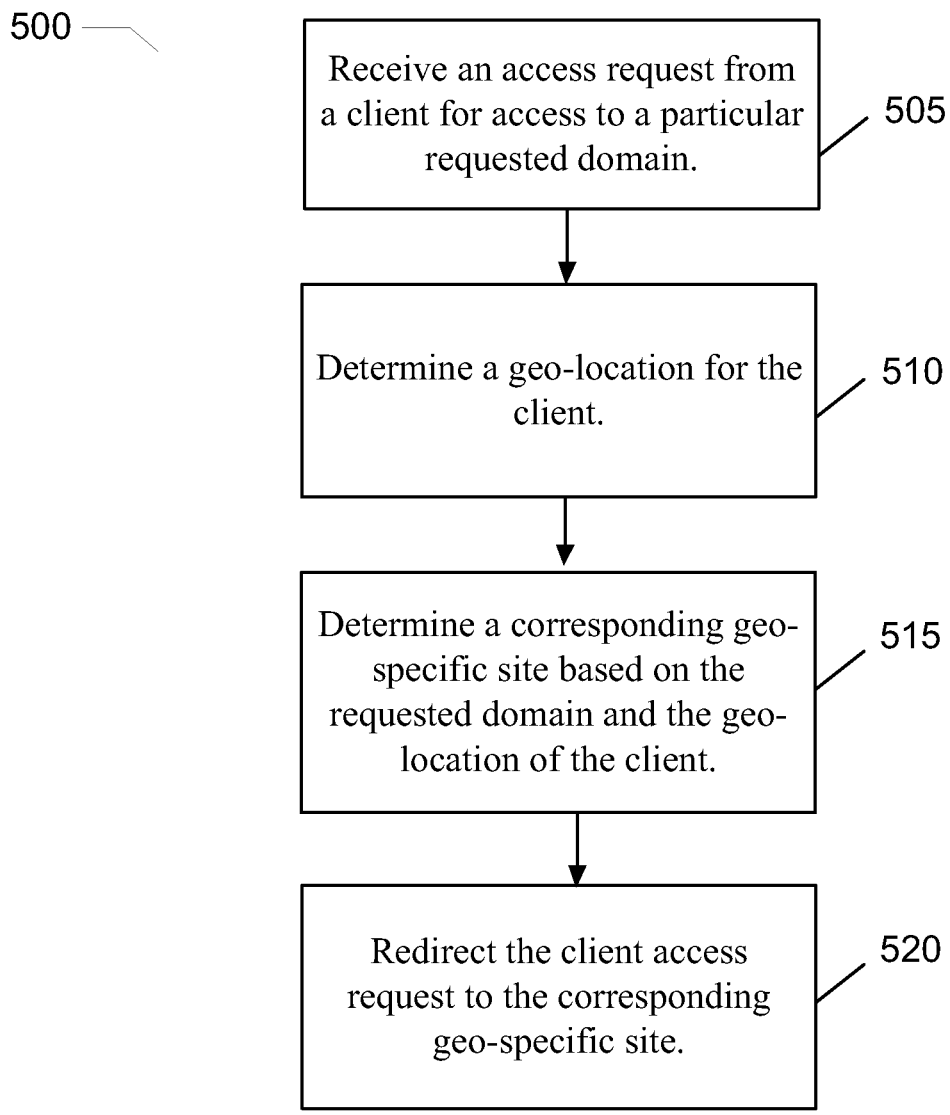
FIG. 5 is a processing flow chart illustrating an example embodiment of a system and method for managing an Internet domain based on the geographic location of an accessing user as described herein.

FIG. 5 is a processing flow chart illustrating an example embodiment 500 of a system and method for managing an Internet domain based on the geographic location of an accessing user as described herein. The method of an example embodiment includes: receiving an access request from a client for access to a particular requested domain (processing block 505); determining a geo-location for the client (processing block 510); determining a corresponding geo-specific site based on the requested domain and the geo-location of the client (processing block 515); and redirecting the client access request to the corresponding geo-specific site (processing block 520).

Various methods of obtaining geographic information, combining such geographic information, and inferring a network address corresponding to geographic information can be used. The details of the geolocation techniques used in the various embodiments are described in more detail next.

Figure 6:
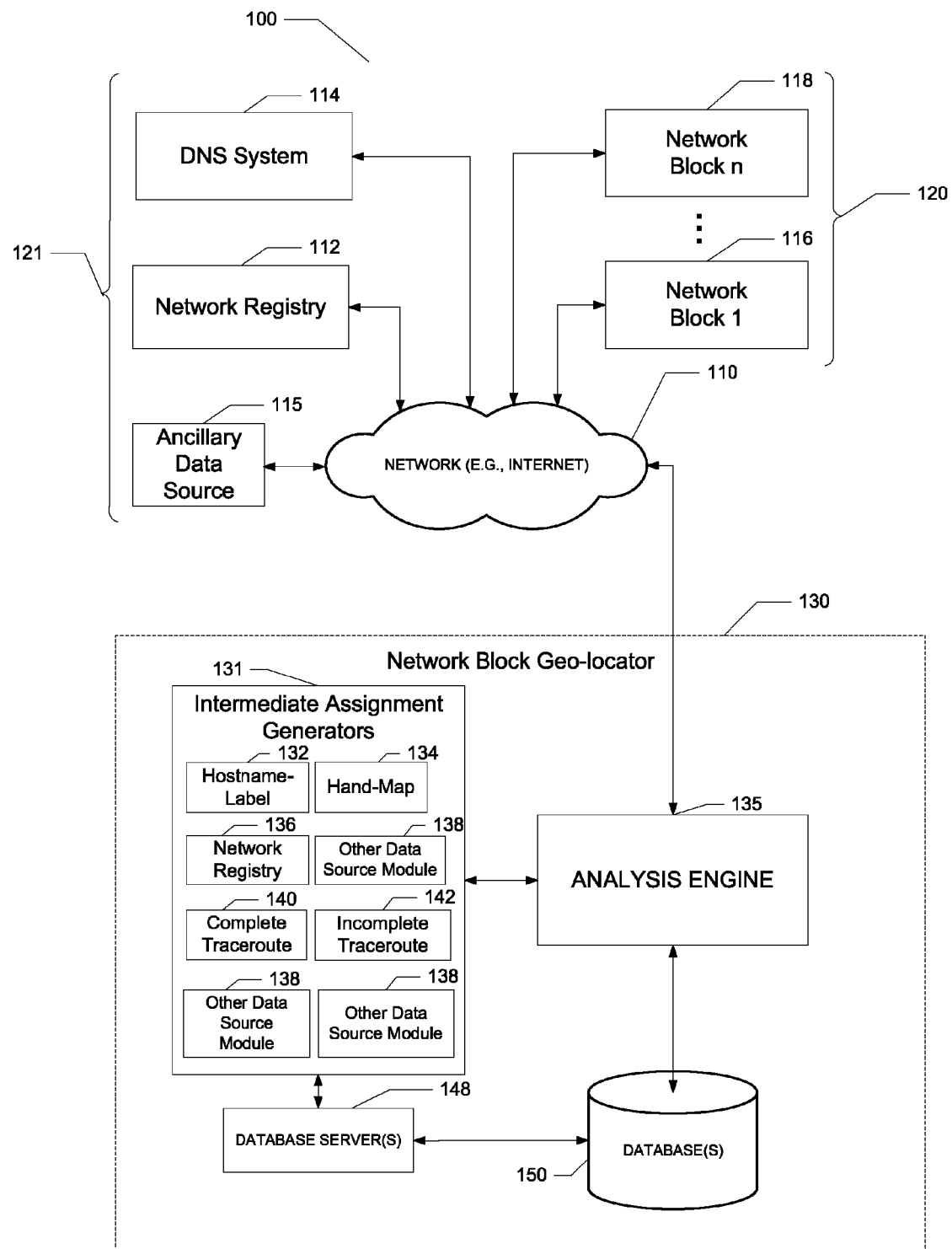
FIG. 6 illustrates a network diagram depicting a system having a set of network blocks and a set of data sources in network communication with a network block geo-locator via network, according to an example embodiment.

FIG. 6 illustrates a network diagram depicting a system 100 having a set of network blocks 116 and 118 (collectively network blocks 120) and a set of data sources 121 (e.g. network registry 112 and Domain Name Server (DNS) System 114) in network communication with a network block geo-locator 130 via network 110, according to an example embodiment. Network blocks 120 represent network entities having network addresses within a defined network block and for which a geographic location can be determined. Data sources 121 represent various data sources from which geo-location data may be collected. These data sources 121 may include, but are not limited to, network registries, DNS servers, network Whois data sources, autonomous system networks, network administrative data, geographic databases, user demographic/profile information, governmental data sources, remote data collection agents hosted on data collection machines, and the like. In addition, data sources 121 can also include ancillary data source 115 from which other network information can be obtained (e.g. whether a network is routable, the type of data connection, etc.)

Data sources 121 provide geo-location information that may be used to determine the geographic location of a network entity with varying levels of accuracy and trustworthiness. Geo-location information provided by some data sources 121 may be used to validate or corroborate the information provided by other data sources 121. These information sources are highly dynamic and subject to widely varying levels of accuracy and trustworthiness over time. As described in more detail herein, various embodiments provide highly adaptable systems and methods for determining the geographic location of a network entity.

Figure 9:
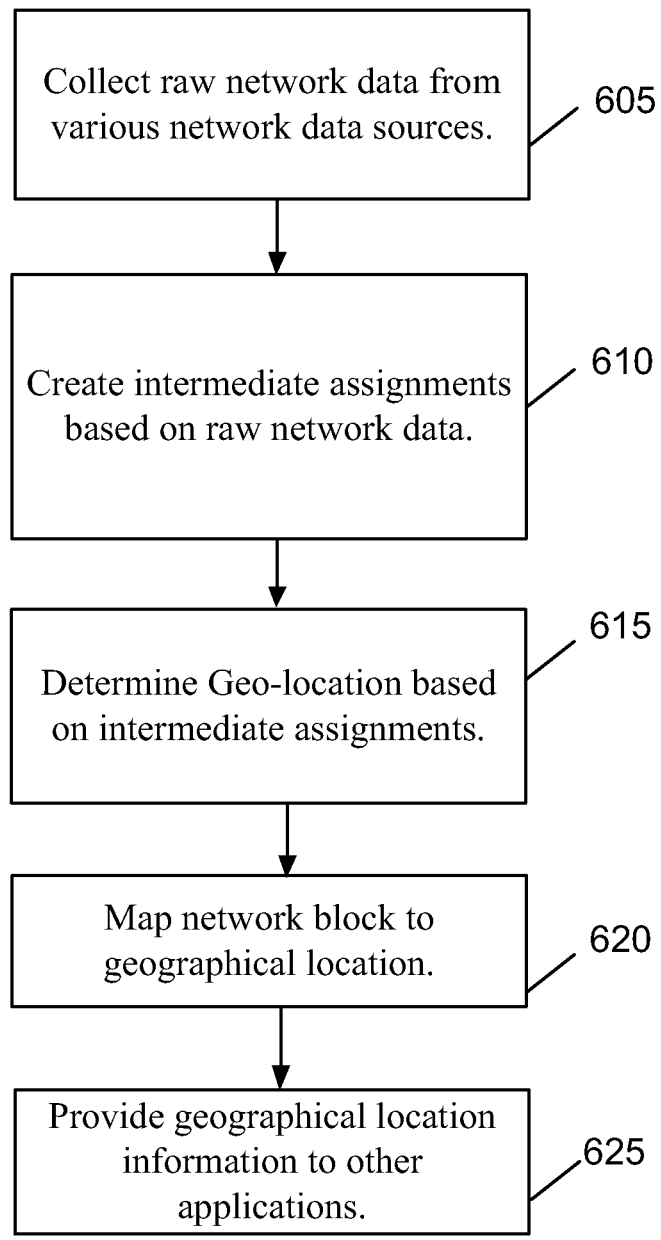
FIG. 9 illustrates a flow diagram showing the basic processing flow in an example embodiment.

Referring now to FIG. 9, a flow diagram illustrates the basic processing flow in an example embodiment. In processing block 605, the network block geo-locator 130 gathers relevant geo-location data from the data sources 121. This data can include raw data from DNS systems 114, various internet registries 112, information from traceroutes, and other network data sources. This raw data is processed in processing block 610 to extract geo-location-relevant information from the raw data collected from the data sources 121. This extracted geo-location-relevant information can be used to create intermediate assignments that associates available geo-location-relevant information with the network blocks to which the information relates. In this manner, untested or incomplete geo-location information can be initially associated with particular network blocks. Intermediate assignments are geo-location assignments for a network that are based on distinct data sources and methods. Because the distinct data sources may be of varying reliability and may require specialized processing, the network block geo-locator 130 of an example embodiment described herein provides a separate intermediate assignment generator for each data source 121 from which geo-location-relevant information is obtained. A group of intermediate assignment generators 131 are shown in FIG. 6. In processing block 610 shown in FIG. 9, one or more of these intermediate assignment generators 131 are employed by the network block geo-locator 130 to create intermediate assignments from the raw network data.

As shown in FIG. 6, a particular example embodiment of the group of intermediate assignment generators 131 are shown to include a hostname-label intermediate assignment generator 132, a hand-mapped intermediate assignment generator 134, a network registry intermediate assignment generator 136, a complete traceroute intermediate assignment generator 140, an incomplete traceroute intermediate assignment generator 142, and other intermediate assignment generators 138. Each of the group of intermediate assignment generators 131 is associated with a distinct data source 121. In a particular embodiment, a particular intermediate assignment generator 138 could be associated with a plurality of data sources 121.

In a particular example embodiment, the hostname-label intermediate assignment generator 132 can use the hostname available on the network 110 and perhaps an associated token that may identify a specific country, city, or state associated with the hostname. The hand-mapped intermediate assignment generator 134 can use data provided by network experts who have analyzed a particular network of interest and who have produced geo-location information by hand or using offline automated techniques. The network registry intermediate assignment generator 136 can use network registry information available on the network 110, such as information provided by a well-known WhoIs service. Other available network registry information can also be used to provide or imply geo-location information for the network registry intermediate assignment generator 136.

The complete traceroute intermediate assignment generator 140 uses traceroute information to obtain geo-location information. Tracerouting is a well-known technique for tracing the path of a data packet from a source network entity to a destination network entity. In a particular embodiment, traceroute is a computer network tool used to determine the route taken by packets across an Internet Protocol (IP) network. Tracerouting can use Internet Control Message Protocol (ICMP) packets to accomplish the traceroute. ICMP is one of the core protocols of the Internet protocol suite. It is chiefly used by networked computers' operating systems to send error messages—indicating, for instance, that a requested service is not available or that a host or router could not be reached. Routers, switches, servers, and gateways on the data path can provide geo-location information associated with the source network entity or the destination network entity. In the case where a complete traceroute is available and the very last hop of a traceroute that completed was associated with a given country, state, or city, the complete traceroute intermediate assignment generator 140 can be used to obtain the geo-location data and to create the intermediate assignment. In the case where a complete traceroute is not available or the very last hop of a traceroute that did not actually complete was associated with a given country, state, or city, the incomplete traceroute intermediate assignment generator 142 can be used to obtain the available geo-location data and to create the intermediate assignment as best as can be determined from the incomplete data. Similarly, the other intermediate assignment generators 138 can use specific techniques to obtain geo-location information from particular data sources 121 and create the intermediate assignments as best as can be determined from the data obtained from the other data sources.

Referring again to FIG. 9, once the intermediate assignments are created in processing block 610, the network block geo-location is determined based on the intermediate assignments in processing block 615. In this process, a mapping is created from a particular network block to a geographical location. As will be described in more detail below, the analysis engine 135 (shown in FIG. 6) uses the intermediate assignment generators 131 to determine network block geo-location. The mapping of a particular network block to a geographical location is complete in processing block 620 and the geographical location information can be provided to other applications via an interface in processing block 625.

Figure 7:
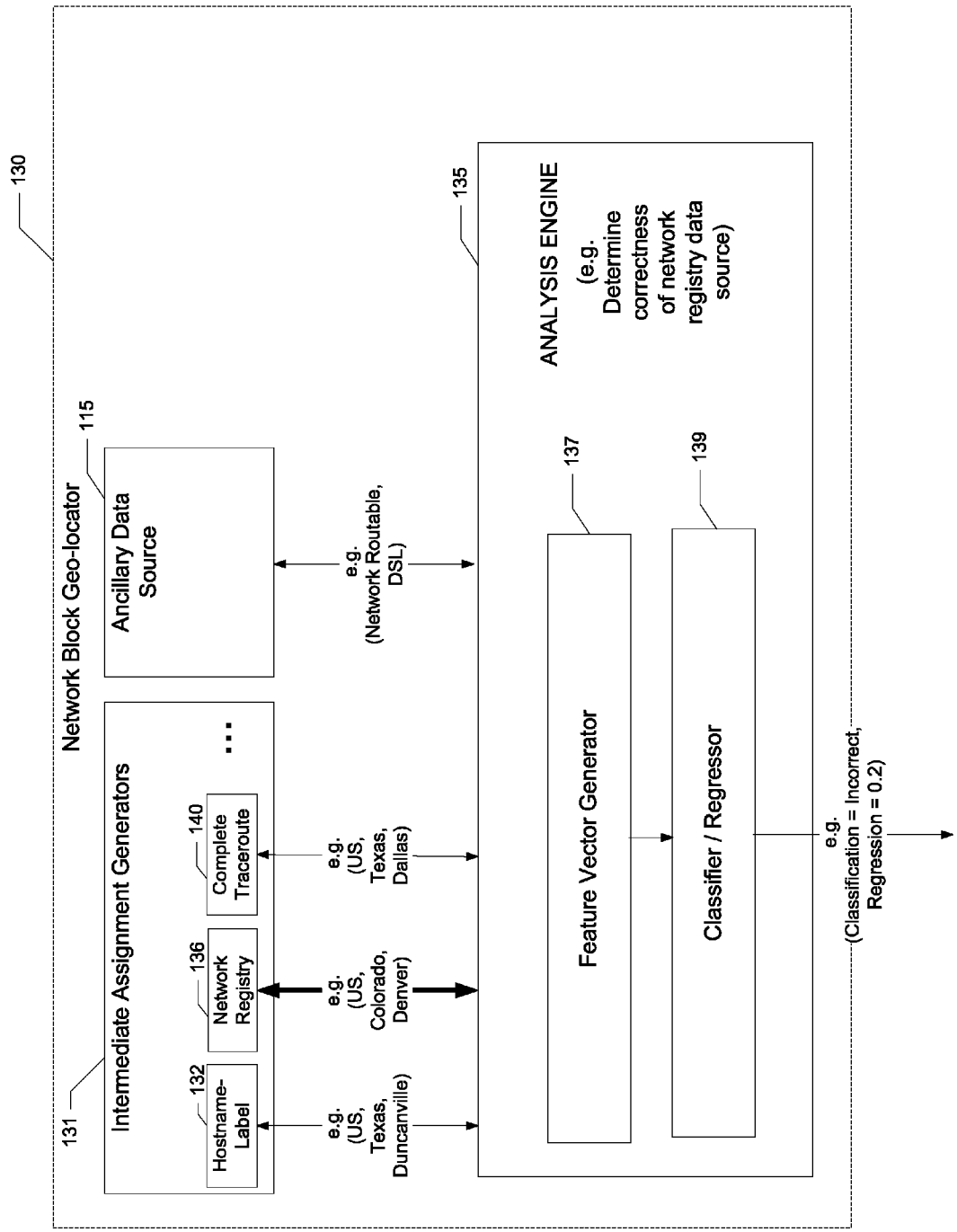
FIG. 7 illustrates a supervised approach in an example embodiment for creating classification and regression data for the intermediate assignments produced by the intermediate assignment generators.
Figure 8:
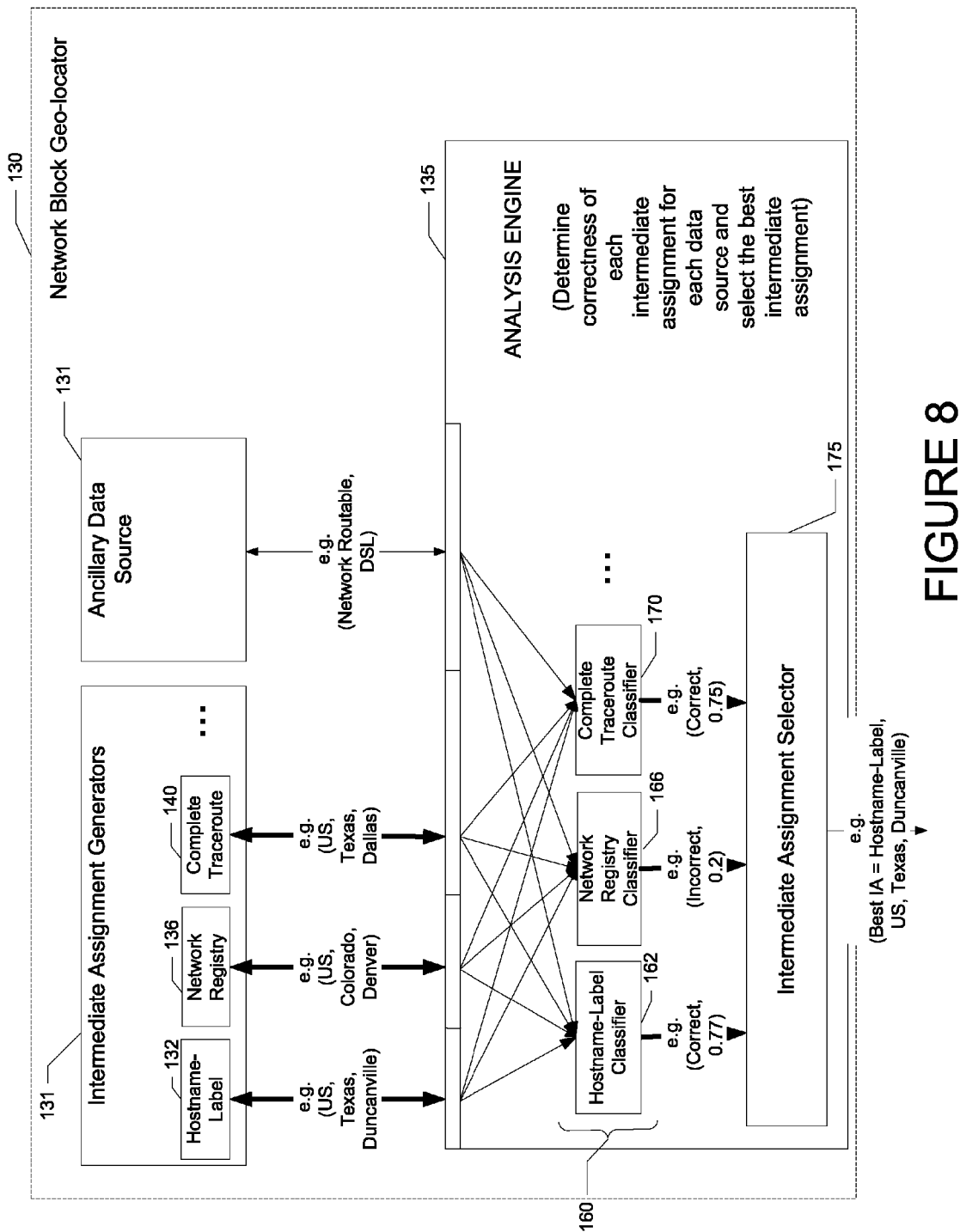
FIG. 8 illustrates the classifiers that receive the outputs of each of the intermediate assignment generators.

Referring now to FIGS. 7 and 8, the geo-location processing performed by the analysis engine 135 is illustrated in more detail. FIG. 7 illustrates a supervised approach in an example embodiment for creating classification and regression data for the intermediate assignments produced by the intermediate assignment generators 131. In general, a classifier is a mapping from a (discrete or continuous) feature space X to a discrete set of labels, Y. A regressor is a mapping from a (discrete or continuous) feature space X to a continuous-valued real number, Z. As is well known generally, the input to a classifier or regressor can be a feature vector of fixed length, M. Each element in the feature vector may be a real number or a discrete categorical item. The use of such feature vectors is well known to those of ordinary skill in the art.

In a particular embodiment, feature vectors may be used to perform classification or regression on network data sources. Feature vectors can include a set of attributes associated with a network data source. Each attribute can be a discrete value or a continuous value (e.g. real number). The value for a particular attribute represents the degree to which that attribute is present (or absent) in the particular data source. The combination (aggregate) of each of the attribute values in the feature vector represents a classification or regression value for the particular network data source.

Classifiers and regressors can be created using a supervised learning approach. Supervised learning is a machine learning technique for creating a function from training data. The training data can consist of a set of feature vectors and the desired outputs for each of the feature vectors. Using the supervised learning approach, training data can be compared with the feature vectors associated with particular network data sources. In this manner, the analysis engine 135 can determine how far off a particular data source is from a desired output. Further, when training a classifier, it is also possible to generate an error rate estimate for that classifier using a technique such as cross-validation, which is described in more detail below. For a regressor, cross validation can be used to estimate the average error of the regressor.

Referring now to a particular embodiment shown in FIG. 7, the analysis engine 135 includes a classifier/regressor 139. Classifier/regressor 139 can be used to classify and validate the intermediate assignments created by the intermediate assignment generators 131. The classifier/regressor 139 uses feature vectors created by feature vector generator 137. The feature vector generator 137 uses the output data provided by each of the intermediate assignment generators 131 to build one or more feature vectors for each of the intermediate assignment generators 131. As described above, each of the network data sources 121 have a corresponding one of the intermediate assignment generators 131. The feature vector generator 137 can also uses the output data provided by the ancillary data source 115 to build the one or more feature vectors.

In a particular embodiment, the output classes for the output of the intermediate assignment generators 131 consist of two classes: correct or incorrect. In this embodiment, the criterion for correctness can be that the city of the intermediate assignment is correct. In this example, the classifier/regressor 139 can process the intermediate assignment output as shown by example in FIG. 7.

As shown in FIG. 7, the analysis engine 135 is attempting to determine the correctness of the network registry data source 112 by validating the output of network registry assignment generator 136 against the outputs of the hostname-label assignment generator 132, the output of the complete traceroute assignment generator 140, and the output of the ancillary data source 115. In the example shown in FIG. 7, the output of the hostname-label assignment generator 132 indicates that the geo-location provided by that corresponding data source is, "US, Texas, Duncanville." The output of the complete traceroute assignment generator 140 indicates that the geo-location provided by that corresponding data source is, "US, Texas, Dallas." In contrast, the output of the network registry assignment generator 136 indicates that the geo-location provided by that corresponding data source is, "US, Colorado, Denver." Given the data received by the classifier/regressor 139 shown in the example of FIG. 7, the classifier/regressor 139 might output a classification value of, "Incorrect" and a low regression value (e.g. 0.2) indicating that the classifier/regressor 139 determined that the geo-location data provided by the network registry data source 112 is incorrect. In a particular embodiment, the regressor portion of classifier/regressor 139 can be configured to produce a continuous value between 0 and 1, where 0 indicates an incorrect condition and 1 indicates a correct condition.

In processing the output of network registry assignment generator 136 against the outputs of the hostname-label assignment generator 132, the output of the complete traceroute assignment generator 140, and the output of the ancillary data source 115, the feature vector generator 137 generates a feature vector for each of the network data sources 121 corresponding to each of the intermediate assignment generators 131. These feature vectors are described in more detail below.

In the example shown in FIG. 7, the analysis engine 135 determined the correctness of a single data source (i.e. the network registry data source 112) by validating the output of the network registry assignment generator 136 against the outputs of other intermediate assignment generators 131 and the ancillary data source 115. In the example shown in FIG. 7, the analysis engine 135 can determine the correctness of each network data source 121 by validating the output of each network data source 121 against the outputs of the other intermediate assignment generators 131 and the ancillary data source 115. In this manner, N classifiers or regressors can be used to rank order and select from one or more N intermediate assignments. Referring to FIG. 8, analysis engine 135 is shown to include a classifier 160 for each of the intermediate assignments corresponding to each of the intermediate assignment generators 131. Using classifiers 160, analysis engine 135 can determine the correctness of each intermediate assignment and its corresponding network data source 121. Classifiers 160 can also select and rate each intermediate assignment. Then, based on the error rate estimate or regression value computed by each classifier 160, the best intermediate assignment can be selected.

As shown in FIG. 8, the analysis engine 135 includes an intermediate assignment selector 175 that performs the selection of the best classifier 160 output. Possible selection rules include simple logical combinations of the classification, the regression, and the error rate estimate for the classifier. For example, among the intermediate assignments classified as, "Correct", the intermediate assignment with a maximized, "Goodness" value can be selected, where, "Goodness" can be defined as (regressionValue*(1−errorRate of classifier). Alternatively, the intermediate assignment selector 175 can interpolate between the geo-locations of the intermediate assignments that were classified as, "Correct." For example, a particular geo-location can be determined to be halfway between Dallas and Duncanville, Tex. if each of these correct intermediate assignments were provided to the intermediate assignment selector 175.

Note that it is possible that at times, all intermediate assignments can be determined to be, "Incorrect." In this case, an external heuristic can be used to assign the network block geo-locations.

In the example shown in FIG. 8, the classifiers 160 receive the outputs of each of the intermediate assignment generators 131. In the particular example, the hostname-label intermediate assignment generator 132 produces an output indicating a geo-location for the network block at, "US, Texas, Duncanville." In the particular example, the network registry intermediate assignment generator 134 produces an output indicating a geo-location for the network block at, "US, Colorado, Denver." The complete traceroute intermediate assignment generator 140 produces an output indicating a geo-location for the network block at, "US, Texas, Dallas." The ancillary data source 131 produces an output indicating that the network block is, "Routable and Digital Subscriber Loop (DSL)." Each of these outputs are provided to each of the classifiers 160 of analysis engine 135. Using the classification/regression process described above, each of the classifiers 160 can validate the output of their particular data source against the output produced by each of the other data sources. As a result, each classifier 160 can determine if each of the corresponding intermediate assignments is correct or incorrect. The classifiers 160 can also produce corresponding regression values. These values produced by the classifiers 160 can be used by the intermediate assignment selector 175 to select the best intermediate assignment from among the available intermediate assignments provided to the intermediate assignment selector 175. In the particular example of FIG. 8, the intermediate assignment selector 175 determines that the best intermediate assignment is produced by the hostname-label data source, which indicates a geo-location of, "US, Texas, Duncanville."

Referring to FIGS. 10 through 12, examples of portions of the feature vectors used in a particular embodiment are illustrated. These feature vectors are generated by feature vector generator 137 and provided as inputs to classifiers 160 as described above. In the examples illustrated, a specific example of the feature vector for the network registry classifier 166 is provided. This sample feature vector can be viewed as including one or more of the following parts: 1) existence features, which are boolean features indicating whether a particular intermediate assignment was present for a given network block, 2) match features, which are categorical features indicating whether a particular intermediate assignment matched (or was sufficiently proximal in its location) to another intermediate assignment, and 3) ancillary features, which are any features that are neither existence features nor match features.

FIG. 10 illustrates examples of portions of the existence features used in a particular embodiment. Existence features are Boolean features indicating whether a particular intermediate assignment was present for a given network block. In the example shown in FIG. 10, three sample existence features with their corresponding possible values are shown.

FIG. 11 illustrates examples of portions of the match features used in a particular embodiment. Match features are categorical features indicating whether a particular intermediate assignment matched (or was sufficiently proximal in its location) to another intermediate assignment. In the example shown in FIG. 11, three sample match features with their corresponding possible values are shown. Note that in the example shown, a 25 mile threshold is used to illustrate the example; but any arbitrary threshold value or set of values could be used.

FIG. 12 illustrates examples of portions of the ancillary features used in a particular embodiment. Ancillary features are any features that are neither existence features nor match features. In the example shown in FIG. 12, two sample existence features with their corresponding possible values are shown.

In addition to the feature vectors for each of the intermediate assignments, the classifiers use training data as inputs to determine the correctness of the intermediate assignments. In a particular embodiment, a desired output or set of outputs is provided for each feature vector. This training process, where desired outputs are available, along with corresponding feature vectors during the training process, is called supervised training. These desired outputs for the intermediate assignment feature vectors can be obtained from a variety of sources, including: 1) the analysis provided by a network-geographic analyst (e.g. someone who has the expertise in determining the likely geographic location associated with a network), or 2) an external corroboration source, such as a GPS system attached to a client computer system, or a trusted postal address provided by a user from the address. The desired outputs can be associated with each of the corresponding feature vectors to enable the classifiers 160 to appropriately classify each of the intermediate assignments. Each of the classifiers 160 can produce a classification (e.g. correct or incorrect) and/or a regression value (e.g. 0.0 to 1.0) based on an analysis of the intermediate assignment feature vectors and the corresponding desired output training data.

Figure 13:
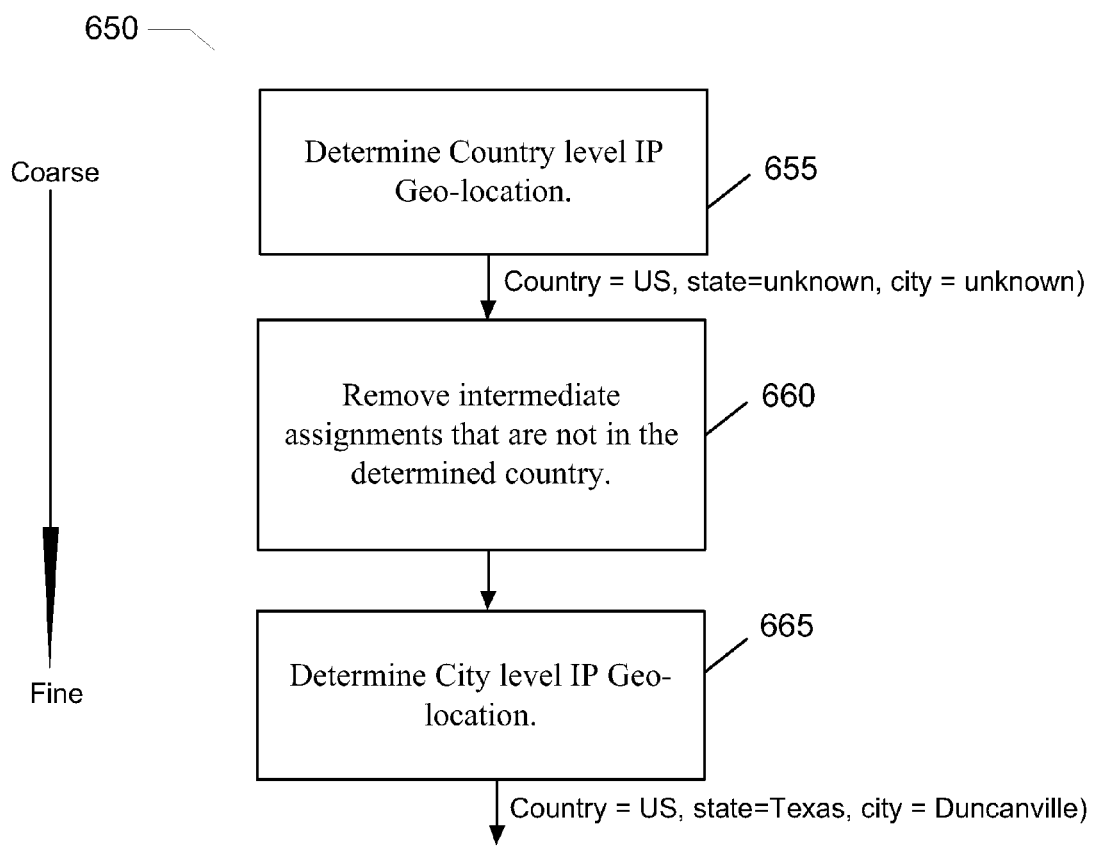
FIG. 13 illustrates a process used in a particular embodiment for determining geo-location of a network block using a coarse to fine approach.

Referring to FIG. 13, a process used in a particular embodiment for determining geo-location of a network block using a coarse to fine approach is illustrated. Using this process, the network block geo-locator 130 can first determine the geo-location of a network block based on a coarse country-level determination. The network data sources 121 can be used to obtain geo-location data corresponding to the network block as described above. This geo-location data can be used to create intermediate assignments which are classified as also described above. As a result, a coarse country-level determination of geo-location can be made (processing block 655). Next, any intermediate assignments generated by any of the intermediate assignment generators 131 that are not within the country of interest can be removed from further processing (processing block 660). Finally, a classification of the remaining (within country) intermediate assignments can be performed to obtain a more fine (e.g. city-level) geo-location determination (processing block 665). If necessary, this process can be repeated until a desired level of geo-location is obtained. Note that many different geographical levels may be used, including continent, country, region, state, city, postal code, latitude/longitude, etc.

Figure 14:
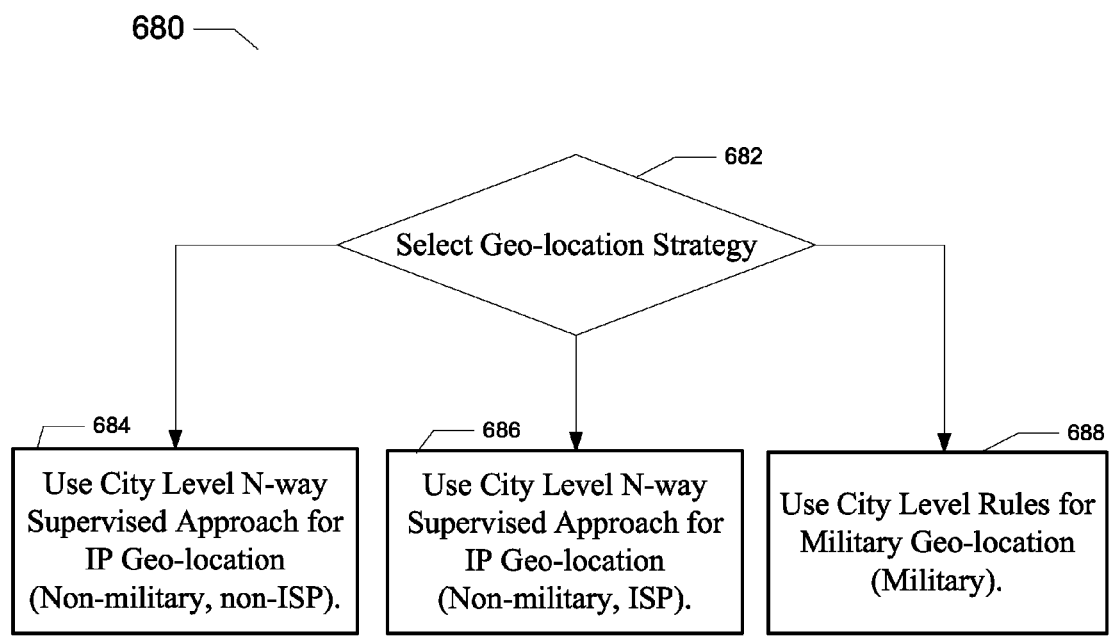
FIG. 14 illustrates a process used in a particular embodiment for choosing among a plurality of available strategies for determining geo-location of a network block.

Referring to FIG. 14, a process used in a particular embodiment for choosing among a plurality of available strategies for determining geo-location of a network block is illustrated. Using this process, more than one strategy for determining geo-location of a network block may be available. For example, a geo-location strategy that is efficient for ISP networks may not be as efficient on other types of non-ISP networks. In other cases, a geo-location strategy that is efficient for military networks may not be as efficient on non-military networks. Thus, depending upon the type of network upon which network block geo-location is being performed, one particular geo-location strategy may be better than another strategy. In the process shown in FIG. 14, if the network block geo-location is being performed on a non-military, non-ISP network, processing block 684 is performed to use a non-military, non-ISP network block geo-location strategy. If the network block geo-location is being performed on a non-military, ISP network, processing block 686 is performed to use a non-military, ISP network block geo-location strategy. If the network block geo-location is being performed on a military network, processing block 688 is performed to use a military network block geo-location strategy. It will be apparent to those of ordinary skill in the art that other network block geo-location strategies could be provided and made selectable in the process shown in FIG. 14.

It should be understood that the network block geo-locator 130 described herein can use a plurality of intermediate assignment generators 131 and a corresponding plurality of intermediate assignment classifiers 160. Thus, the architecture of the described embodiments provide a flexible platform in which new network data sources 121 and their corresponding intermediate assignment generators 131 and intermediate assignment classifiers 160 can be quickly added to the network block geo-locator 130 and used for the geo-location analysis. Similarly, poorly performing or off-line network data sources 121 can be quickly taken off-line and removed from the network block geo-locator 130 and not used for the geo-location analysis. In this manner, the best network geo-location data sources can be used and the described system can quickly adopt new data sources as they become available. As such, the various embodiments described herein improve over prior systems that are hard-wired to hard-coded to a pre-defined and fixed set of network data sources.

Figure 15:
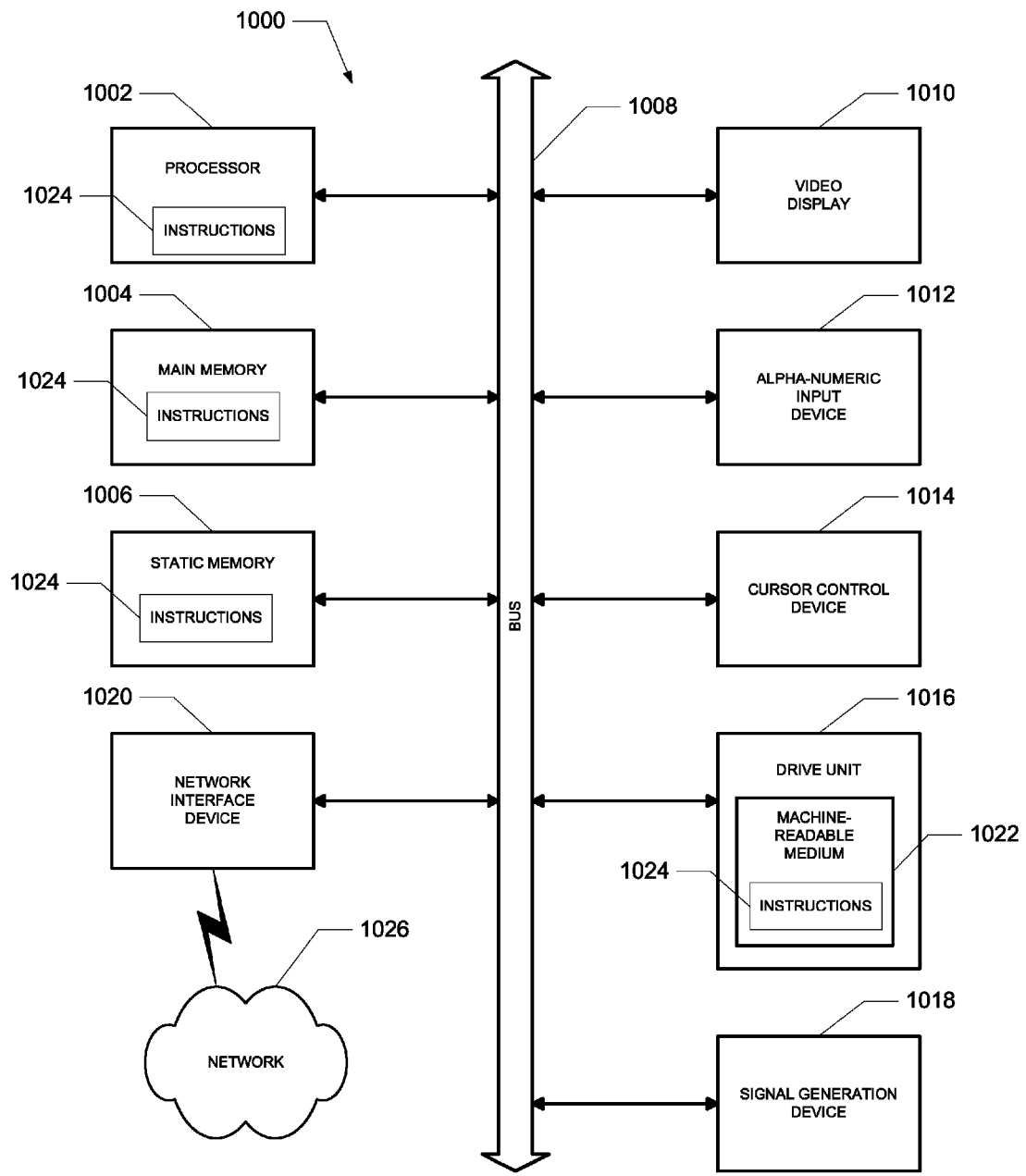
FIG. 15 shows a diagrammatic representation of a machine in the form of a computer system within which a set of instructions, for causing the machine to perform any one or more of the methodologies discussed herein, may be executed, according to an example embodiment.

FIG. 15 shows a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media. The instructions 1024 may further be transmitted or received over a network 1026 via the network interface device 1020.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 1022 is shown in an example embodiment to be a single medium, the term "machine-readable medium" should be taken to include a single non-transitory medium or multiple media (e.g., a centralized or distributed database, and/or associated caches and servers) that store the one or more sets of instructions. The term "machine-readable medium" shall also be taken to include any non-transitory medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical and magnetic media.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, a system and method for managing an Internet domain based on the geographic location of an accessing user have been described. Although embodiments have been described with reference to specific example embodiments, it will be evident that various modifications and changes may be made to these embodiments without departing from the broader spirit and scope of embodiments as expressed in the subjoined claims.

What is claimed is:
1. A method comprising:
receiving an access request from a first client for access to a particular requested domain;
determining a geo-location for the first client using a plurality of intermediate assignment generators comprising at least two different types of intermediate assignment generators, wherein each of the plurality of intermediate assignment generators obtains geo-location-relevant information from a different data source and wherein at least one of classification and regression data are created by comparing two or more intermediate assignments produced by the intermediate assignment generators utilizing a threshold value;

determining a corresponding first geo-specific site based on the requested domain and the geo-location of the first client; and redirecting the first client access request to the corresponding first geo-specific site.

2. The method of claim 1 wherein the first geo-specific site is a licensee or franchisee of the requested domain and wherein the redirecting redirects an access to a specified Internet domain to a server corresponding to the first geo-specific site as compensation for a payment.

3. The method of claim 1 wherein determining a geo-location for the first client is performed by geo-specific domain processing within a site corresponding to the requested domain.

4. The method of claim 1 wherein determining a geo-location for the first client is performed by a geo-specific domain broker operating outside of a site corresponding to the requested domain.

5. The method of claim 1 including:
receive an access request from a second client for access to the particular requested domain, the second client being at a different geo-location relative to the first client;
determining a geo-location for the second client;
determining a corresponding second geo-specific site based on the requested domain and the geo-location of the second client, the second geo-specific site being different from the first geo-specific site; and
redirecting the second client access request to the corresponding second geo-specific site.

6. The method of claim 1 including performing a database lookup to determine if a particular client geo-location corresponds to a particular geo-specific site.

7. The method of claim 1 wherein each of the plurality of intermediate assignment generators generate a feature vector, each feature vector including a plurality of attributes associated with a different network data source, a value for a particular attribute of the plurality of attributes representing a degree to which that attribute is present or absent in a corresponding network data source.

8. A system comprising:
a processor;
a memory coupled to the processor to store information related to domains; and
a geo-location determination module, operably coupled with the processor and the memory, operable to:
receive an access request from a first client for access to a particular requested domain;
determine a geo-location for the first client using a plurality of intermediate assignment generators comprising at least two different types of intermediate assignment generators, wherein each of the plurality of intermediate assignment generators obtains geo-location-relevant information from a different data source and wherein at least one of classification and regression data are created by comparing two or more intermediate assignments produced by the intermediate assignment generators utilizing a threshold value;
determine a corresponding first geo-specific site based on the requested domain and the geo-location of the first client; and
redirect the first client access request to the corresponding first geo-specific site.

9. The system of claim 8 wherein the first geo-specific site is a licensee or franchisee of the requested domain and wherein the redirecting redirects an access to a specified Internet domain to a server corresponding to the first geo-specific site as compensation for a payment.

10. The system of claim 8 wherein determining a geo-location for the first client is performed by geo-specific domain processing within a site corresponding to the requested domain.

11. The system of claim 8 wherein determining a geo-location for the first client is performed by a geo-specific domain broker operating outside of a site corresponding to the requested domain.

12. The system of claim 8 being further configured to:
receive an access request from a second client for access to the particular requested domain, the second client being at a different geo-location relative to the first client;
determine a geo-location for the second client;
determine a corresponding second geo-specific site based on the requested domain and the geo-location of the second client, the second geo-specific site being different from the first geo-specific site; and
redirect the second client access request to the corresponding second geo-specific site.

13. The system of claim 8 being further configured to perform a database lookup to determine if a particular client geo-location corresponds to a particular geo-specific site.

14. The system of claim 8 wherein each of the plurality of intermediate assignment generators generate a feature vector, each feature vector including a plurality of attributes associated with a different network data source, a value for a particular attribute of the plurality of attributes representing a degree to which that attribute is present or absent in a corresponding network data source.

15. An article of manufacture comprising a non-transitory machine-readable storage medium having machine executable instructions embedded thereon, which when executed by a machine, cause the machine to:
receive an access request from a first client for access to a particular requested domain;
determine a geo-location for the first client using a plurality of intermediate assignment generators comprising at least two different types of intermediate assignment generators, wherein each of the plurality of intermediate assignment generators obtains geo-location-relevant information from a different data source and wherein at least one of classification and regression data are created by comparing two or more intermediate assignments produced by the intermediate assignment generators utilizing a threshold value;
determine a corresponding first geo-specific site based on the requested domain and the geo-location of the first client; and
redirect the first client access request to the corresponding first geo-specific site.

* * * * *

UNITED STATES PATENT AND TRADEMARK OFFICE
CERTIFICATE OF CORRECTION

| | | |
|---|---|---|
| PATENT NO. | : 8,838,733 B2 | Page 1 of 1 |
| APPLICATION NO. | : 12/908287 | |
| DATED | : September 16, 2014 | |
| INVENTOR(S) | : Speckbacher et al. | |

It is certified that error appears in the above-identified patent and that said Letters Patent is hereby corrected as shown below:

In the Drawings,

Sheet 8 of 15, Fig. 8, delete second occurrence "131" and insert --115--, therefor In the Specification, In column 10, line 21, delete "classifier)." and insert --classifier)).--, therefor In column 10, line 39, delete "134" and insert --131--, therefor In column 10, line 44, delete "131" and insert --115--, therefor Signed and Sealed this
Twenty-third Day of June, 2015

Michelle K. Lee
*Director of the United States Patent and Trademark Office*